Jan. 18, 1938.　　　B. F. ROSENBERG　　　2,105,757

BORING TOOL

Filed March 13, 1937

Inventor
Benjamin F. Rosenberg
By Glenn S. Noble
Atty.

Patented Jan. 18, 1938

2,105,757

UNITED STATES PATENT OFFICE 2,105,757

BORING TOOL

Benjamin F. Rosenberg, Chicago, Ill., assignor to Scully-Jones & Company, Chicago, Ill., a corporation of Illinois Application March 13, 1937, Serial No. 130,695

2 Claims. (Cl. 77—58)

This invention relates to boring tools such as commonly used for boring or finishing various articles such as engine cylinders or the like. Such tools require fine adjustment and furthermore it is particularly desirable to hold or support the tool bit or cutter rigidly in order to prevent yielding or chattering.

The objects of this invention are to provide an improved boring tool of comparatively simple construction but which will be durable and efficient in operation; to provide a boring tool having a split quill for supporting the bit and means for tightly clamping the bit in the quill; to provide means for propelling and repelling the tool bit whereby it may be readily adjusted toward and away from the work; to provide a particularly fine or michrometic adjustment; to provide adjusting means having a scale for indicating the position of the screw or amount of adjustment; and to provide such other novel features and improvements as will be described more fully in the following specification.

In the accompanying drawing illustrating the invention,

Figure 1:
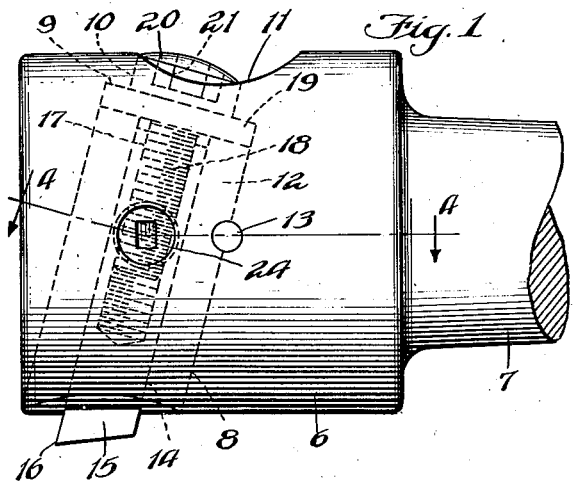
Figure 1 is a side view of the tool.
Figure 2:
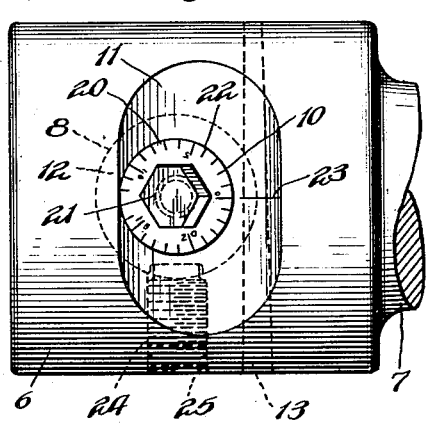
Figure 2 is a top plan view.
Figure 3:
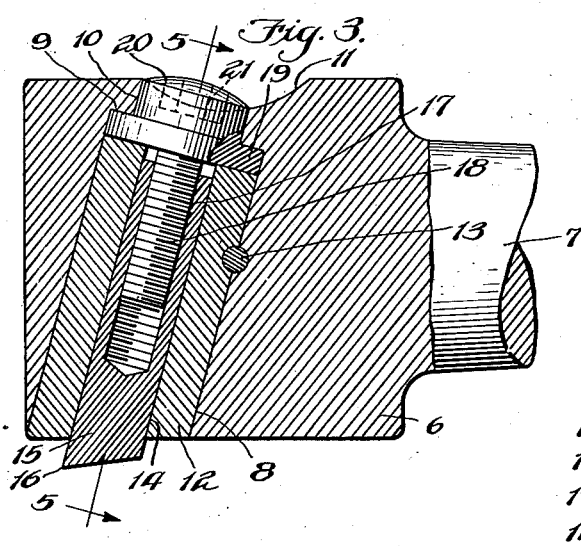
Figure 3 is a longitudinal sectional view.

The boring tool has a head 6 which may be of any cross section but is preferably round as shown and is provided with a shank 7 of any suitable shape, dependent upon the work to be performed. The head 6 has a round hole or recess 8 therein which is arranged diagonally or so that the open end is at approximately the end of the head and the recess or socket extends inwardly so that the bottom or shouldered end 9 is at a substantial distance from the end of the head as clearly shown in Figures 1 and 3. The hole has a reduced portion 10 extending out at the opposite side of the head, thus providing the shoulder 9 at the bottom of the socket. A transverse cut or groove 11 extends across the head adjacent to the reduced portion 10 or at the upper portion, which for convenience may be considered as the top of the head in the illustration shown.

Figure 4:
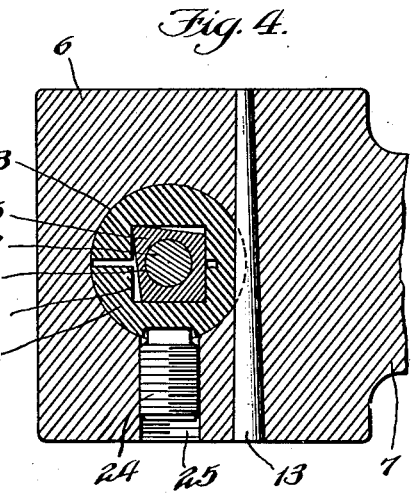
Figure 4 is a sectional view taken on the line 4—4 of Figure 1.
Figure 5:
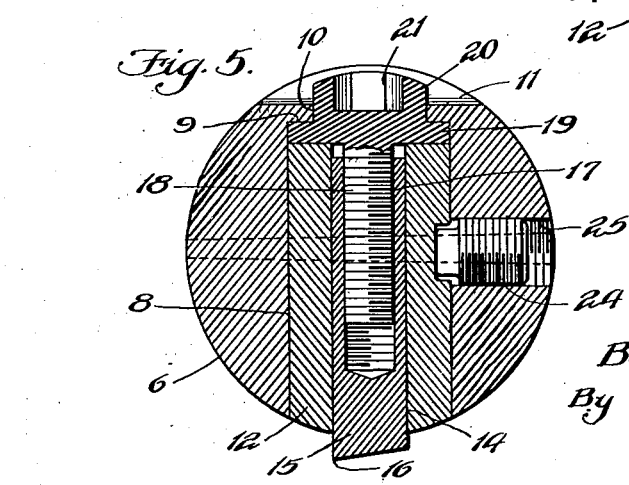
Figure 5 is a cross sectional view.

A split cylindrical clamp or quill 12 fits closely within the hole or socket 8 and is held in position by a tapered pin 13 which extends through the head and engages with a notch or groove in the side of the quill. The quill has a hole 14 therethrough preferably of angular cross section, for receiving the cutting tool or tool bit 15 which is also square or of angular cross section in the body portion thereof and is sharpened or backed off at the end to form the cutting point 16, which point may be tipped with any suitable cutting material if desired. The upper or inner end of the cutting tool or bit 15 has a threaded hole 17 for receiving the correspondingly threaded adjusting screw 18, such threads being preferably of a fine pitch in order to provide for accurate adjustment. The screw 18 has an enlarged circular portion or flange 19 which fits freely within the hole 8 and is positioned between the inner end of the quill 12 and the shoulder 9 at the bottom of the hole. The adjusting screw has a round head 20 which fits freely within the hole or opening 10 and which is provided with a socket 21 of hexagonal cross section or shape to receive an adjusting wrench or tool. The groove or depression 11 is of sufficient depth so that the head 20 does not project beyond the outer surface of the body portion 6. The adjusting screw head is marked with circumferential divisions or scale marks 22 which are adapted to register with the mark or index 23 for adjusting the tool with a michrometer adjustment. A set screw 24 engages with a threaded hole 25 in the side of the head 6 and coacts with the quill for locking the tool bit in adjusted position. This screw is located at one side of the quill at approximately ninety degrees from the split therein and the quill is flattened or spotted to receive the end of the adjusting screw as shown in Figure 4.

When the boring tool is to be used, and the parts are all assembled as shown, the adjusting screw 18 is turned by means of a wrench or tool to move the cutting tool toward or away from the work as desired. During this adjustment the set screw 24 is loosened and when the adjustment has been made the set screw is tightened, which causes the quill to be pressed closely against the side of the socket and also to cause the quill to clamp the cutting tool in adjusted position throughout substantially its full length so that a particularly rigid holder or support for the tool is provided.

While I have shown a preferred form of my invention such as adapted for boring cylinders, it will be apparent that the shape may be modified or other changes made in order to adapt the tool for other uses and therefore I do not wish to be limited to the particular combination shown except as specified in the following claims, in which I claim.

1. A boring tool comprising a boring bar having a head at one end thereof provided with a transverse opening extending from the end of the head diagonally toward the opposite side and having a reduced portion opening through the opposite side and providing a shoulder, a split quill fitting in said opening, a pin engaging with the head and quill for holding the quill in position, said quill having a central bore of angular cross section, a cutting tool fitting in said bore and having a threaded hole at the inner end thereof, a set screw mounted in the head and engaging with the quill for fastening the tool in adjusted position, an adjusting screw engaging with the threaded hole in the tool and having an annular projection engaging with the shoulder at the bottom of said opening, the head of the set screw extending through the reduced portion of the opening and provided with a peripheral scale, and a mark on the head registering with said scale.

2. A boring tool comprising a head portion having a diagonally arranged socket extending therethrough and having a transverse recess at one end of the socket, said socket having an abutment adjacent to the recess, an adjusting screw projecting into the socket and having a round head with its outer end positioned in the transverse recess below the periphery of the head, means on the screw engaging with the abutment to prevent longitudinal movement of the screw in one direction, a tool having a threaded hole engaging with said adjusting screw and extending out at the opposite side of the head, a split quill in said socket for supporting the tool, means for holding the quill against longitudinal movement, and adjusting means for compressing the quill to hold the tool in adjusted position.

BENJAMIN F. ROSENBERG.